(12) United States Patent  
Chen et al.

(10) Patent No.: US 9,151,652 B2
(45) Date of Patent: Oct. 6, 2015

(54) CORIOLIS FLOW SENSOR FABRICATED WITH LAMINATED FILMS PROCESSES

(71) Applicant: Teledyne Instruments, Inc., Thousand Oaks, CA (US)

(72) Inventors: Tong Chen, Palo Alto, CA (US); William J. Alvesteffer, Newport News, VA (US); James M. Camper, Newport News, VA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 203 days.

(21) Appl. No.: 14/033,206

(22) Filed: Sep. 20, 2013

(65) Prior Publication Data

US 2015/0082915 A1    Mar. 26, 2015

(51) Int. Cl.
*G01F 1/84* (2006.01)

(52) U.S. Cl.
CPC .................................. *G01F 1/8468* (2013.01)

(58) Field of Classification Search
None
See application file for complete search history.

(56) References Cited

U.S. PATENT DOCUMENTS

| | | | | |
|---|---|---|---|---|
| 5,009,108 A | * | 4/1991 | Harada et al. | 73/704 |
| 5,581,028 A | * | 12/1996 | Barth et al. | 73/204.26 |
| 6,477,901 B1 | | 11/2002 | Tadigadapa et al. | |
| 6,553,845 B2 | | 4/2003 | Ohnishi et al. | |
| 6,684,715 B1 | | 2/2004 | Cage | |
| 6,769,301 B2 | | 8/2004 | Barger et al. | |
| 6,880,576 B2 | * | 4/2005 | Karp et al. | 137/806 |
| 6,935,010 B2 | | 8/2005 | Tadigadapa et al. | |
| 7,568,399 B2 | * | 8/2009 | Sparks et al. | 73/861.355 |
| 7,895,905 B2 | | 3/2011 | Lammerink et al. | |
| 7,921,737 B2 | | 4/2011 | Sparks et al. | |
| 8,585,910 B2 | * | 11/2013 | Sparks et al. | 216/2 |
| 2003/0061889 A1 | * | 4/2003 | Tadigadapa et al. | 73/861.355 |
| 2005/0155433 A1 | * | 7/2005 | Won et al. | 73/754 |
| 2008/0041151 A1 | * | 2/2008 | Fuertsch et al. | 73/204.16 |
| 2008/0121042 A1 | * | 5/2008 | Miller et al. | 73/649 |
| 2008/0314161 A1 | * | 12/2008 | Sparks et al. | 73/861.354 |
| 2009/0038412 A1 | * | 2/2009 | Nakao | 73/861.357 |
| 2009/0151422 A1 | * | 6/2009 | Unger et al. | 73/1.16 |
| 2009/0308177 A1 | * | 12/2009 | Lammerink et al. | 73/861.355 |
| 2010/0037706 A1 | * | 2/2010 | Sparks et al. | 73/861.355 |
| 2010/0037708 A1 | * | 2/2010 | Sparks et al. | 73/861.357 |
| 2010/0043569 A1 | * | 2/2010 | Keita et al. | 73/861.357 |
| 2010/0122585 A1 | * | 5/2010 | Brouwer et al. | 73/861.357 |
| 2011/0214512 A1 | * | 9/2011 | Sparks et al. | 73/861.355 |

\* cited by examiner

*Primary Examiner* — Harshad R Patel
(74) *Attorney, Agent, or Firm* — K&L Gates LLP

(57) ABSTRACT

A coriolis flow sensor is disclosed. The coriolis flow sensors comprises a first substrate layer, a second substrate layer, and a third substrate layer. The first substrate layer comprises a first wall. The second substrate layer comprises a second wall. The third substrate layer is disposed between the first and second substrate layers in a stacked configuration. The third substrate layer defines a flow path. The first and second walls of the respective first and second substrates and the flow path defined by the third substrate layer define a first flow channel configured to receive a fluid therethrough. A first actuator is configured to generate vibrations in the first flow channel. The first flow channel is mechanically moveable.

25 Claims, 10 Drawing Sheets

CORIOLIS FLOW SENSOR FABRICATED WITH LAMINATED FILMS PROCESSES

BACKGROUND

Coriolis flow sensors are used to measure the mass flow and/or density of a fluid flowing through a channel. Current coriolis flow sensors are predominately large size flow sensors. Although large size flow sensors are adequate for detecting mass flow of a liquid through large channels, current sensors are insufficient for detecting mass flow on smaller scales. Current coriolis sensors are also insufficient for detecting mass flow of a gas due to rigid nature of current structures and materials.

Some work has been directed to developing microelectromechanical systems (MEMS) comprising coriolis flow sensors. MEMS components are expensive to manufacture and are not suitable for low-cost or low-volume applications. MEMS coriolis flow sensors are further limited to liquid phase only sensors, as the lower density of a gas phase may be difficult for a MEMS-based coriolis sensor to detect.

SUMMARY

In various embodiments, a coriolis flow sensor apparatus is disclosed. The apparatus comprises a first substrate layer, a second substrate layer, and a third substrate layer. The first substrate layer comprises a first wall. The second substrate layer comprises a second wall. The third substrate layer is disposed between the first and second substrate layers in a stacked configuration. The third substrate layer defines a flow path. The first and second walls of the respective first and second substrates and the flow path defined by the third substrate layer define a first flow channel configured to receive a fluid therethrough. A first actuator is configured to generate vibrations in the first flow channel. The first flow channel is mechanically moveable.

In various embodiments, an integrated system for measuring flow of a medium is disclosed. The integrated system comprises a control circuit and a coriolis flow sensor. The coriolis flow sensor comprises a first substrate layer, a second substrate layer, and a third substrate layer. The first substrate layer comprises a first wall. The second substrate layer comprises a second wall. The third substrate layer disposed between the first and second substrate layers in a stacked configuration. The third substrate layer defines a flow path. The first and second walls of the first and second substrates and the flow path defined by the third substrate layer define a first flow channel configured to receive a fluid therethrough. An actuator is configured to generate vibrations in the first flow channel. One or more sensors are configured to detect vibrations of the first and second walls of the first flow channel. The vibrations correspond to a coriolis force exerted on the first and second walls of the first flow channel when the fluid flows within the first flow channel.

In various embodiments, a method for generating a coriolis flow sensor is disclosed. The method comprises arranging a first substrate layer, a second substrate layer, and a third substrate layer in a stacked configuration. The first substrate layer comprises a first wall and the second substrate layer comprises a second wall. The third substrate layer defines a flow path. The first and second walls of the first and second substrates and the flow path defined by the third substrate layer define a first flow channel configured to receive a fluid therethrough. The method further comprises laminating the first substrate layer, the second substrate layer, and the third substrate layer.

In various embodiments, an apparatus is disclosed. The apparatus comprises a first substrate layer, a second substrate layer, and a third substrate layer. The first substrate layer comprises a first wall. The second substrate layer comprises a second wall. The third substrate layer is disposed between the first and second substrate layers in a stacked configuration. The third substrate layer defines a flow path. The first and second walls of the respective first and second substrates and the flow path defined by the third substrate layer define a first flow channel configured to receive a fluid therethrough. The first substrate layer, the second substrate layer, and the third substrate layer comprise a flexible plastic film substrate. An actuator is configured to generate vibrations in the first flow channel. One or more sensors are coupled to the first flow channel to detect vibrations of the first and second walls of the first flow channel. The vibrations correspond to a coriolis force exerted on the first and second walls of the first flow channel when the fluid flows within the first flow channel. The first substrate layer, the second substrate layer, and the third substrate layer each comprise a width, a length, and a thickness. The length is at least ten times the width and the width is at least three times the thickness.

FIGURES

The features of the various embodiments are set forth with particularity in the appended claims. The various embodiments, however, both as to organization and methods of operation, together with advantages thereof, may best be understood by reference to the following description, taken in conjunction with the accompanying drawings as follows:

DESCRIPTION

Reference will now be made in detail to several embodiments, including embodiments showing example implementations of a coriolis flow sensors comprising a plurality of substrate layers. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

Figure 1:
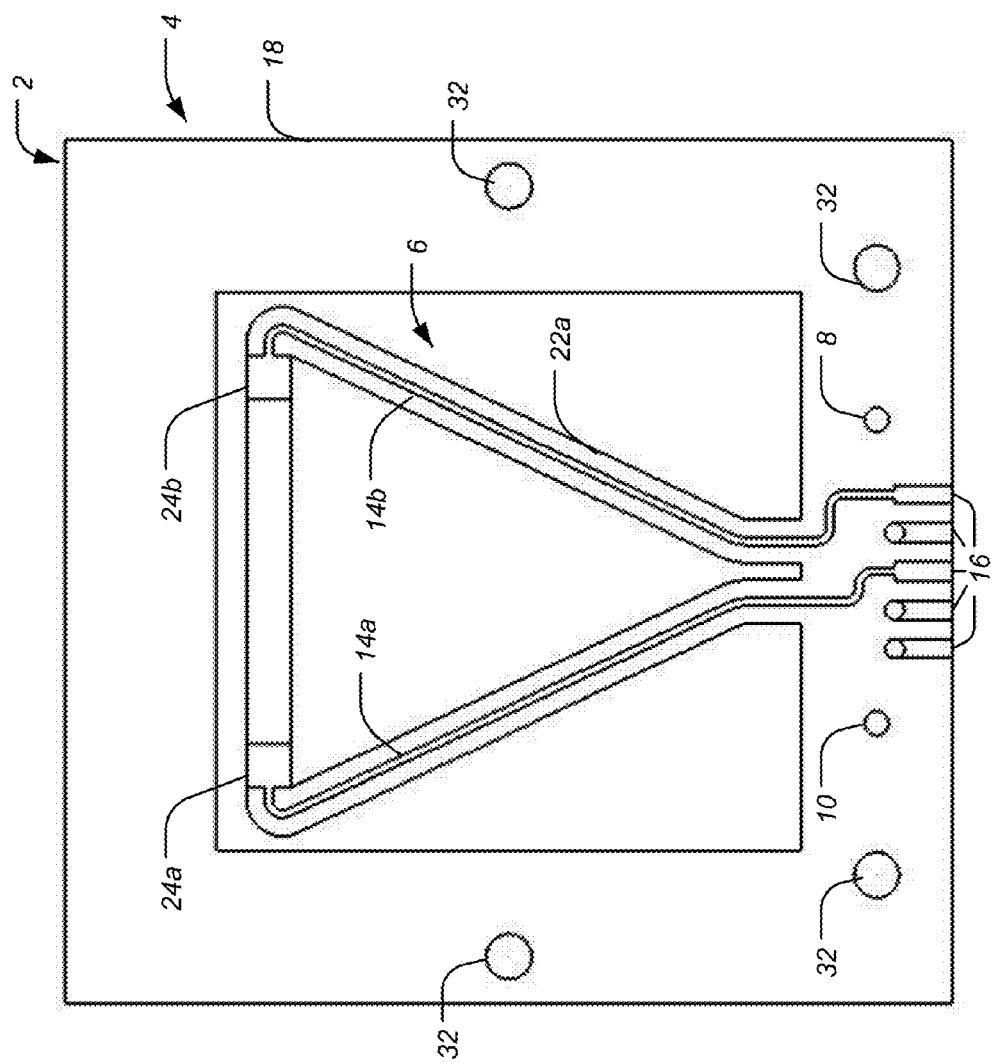
FIG. 1 illustrates one embodiment of a first substrate layer of a coriolis flow sensor comprising a plurality of substrate layers.

FIG. 1 illustrates one embodiment a coriolis flow sensor 2 comprising a plurality of substrate layers. The coriolis flow sensor 2 may comprise a plurality of substrate layers. The plurality of substrate layers are arranged in a stacked configuration. When the plurality of substrate layers are arranged in a stacked configuration, the plurality of substrate layers define flow channel 6. The flow channel 6 is configured to receive a fluid from a fluid source. The flow channel 6 may be configured to receive, for example, a liquid and/or a gas. An inlet 8 receives the fluid from the fluid source. The fluid traverses the flow channel 6 and exits the flow channel at an outlet 10. An oscillating vibration may be induced in the flow channel 6. The oscillating vibration may be induced by one or more actuators 12 (see FIG. 2). The actuators 12 may comprise mechanical, electrical, and/or any other suitable means for inducing oscillating vibrations in the flow channel 6. As the fluid traverses the flow channel 6, the vibration of the flow channel 6 causes the fluid to exert a coriolis force on the flow channel 6. The coriolis force causes the flow channel 6 to bend. The bending of the flow channel 6 may be detected as a change in the vibration of the flow channel 6. The change in the vibrations of the flow channel 6 is detected by one or more sensors 24. The vibrations may correspond to a mass flow rate and/or a density of the fluid flowing through the flow channel 6. The sensor 24 may be configured to detect a frequency, a phase shift, and/or an amplitude of the vibrations of the flow channel 6.

FIG. 1 shows a first substrate layer 18 of the coriolis flow sensor 2. The first substrate layer 18 comprises a first wall 22a. The first wall 22a may include one or more components formed thereon. In some embodiments, one or more sensors 24a, 24bb are coupled to the first wall 22a. A printed circuit path 14a, 14b couples the sensors 24a, 24b to a plurality of circuit connections 16. The plurality of circuit connections 16 may be arranged to interface the coriolis flow sensor 2 with a larger circuit, such as, for example, a control circuit. The sensors 24a, 24b may be physically, electrically, optically, wirelessly, and/or otherwise coupled to the first wall 22a.

Figure 2:
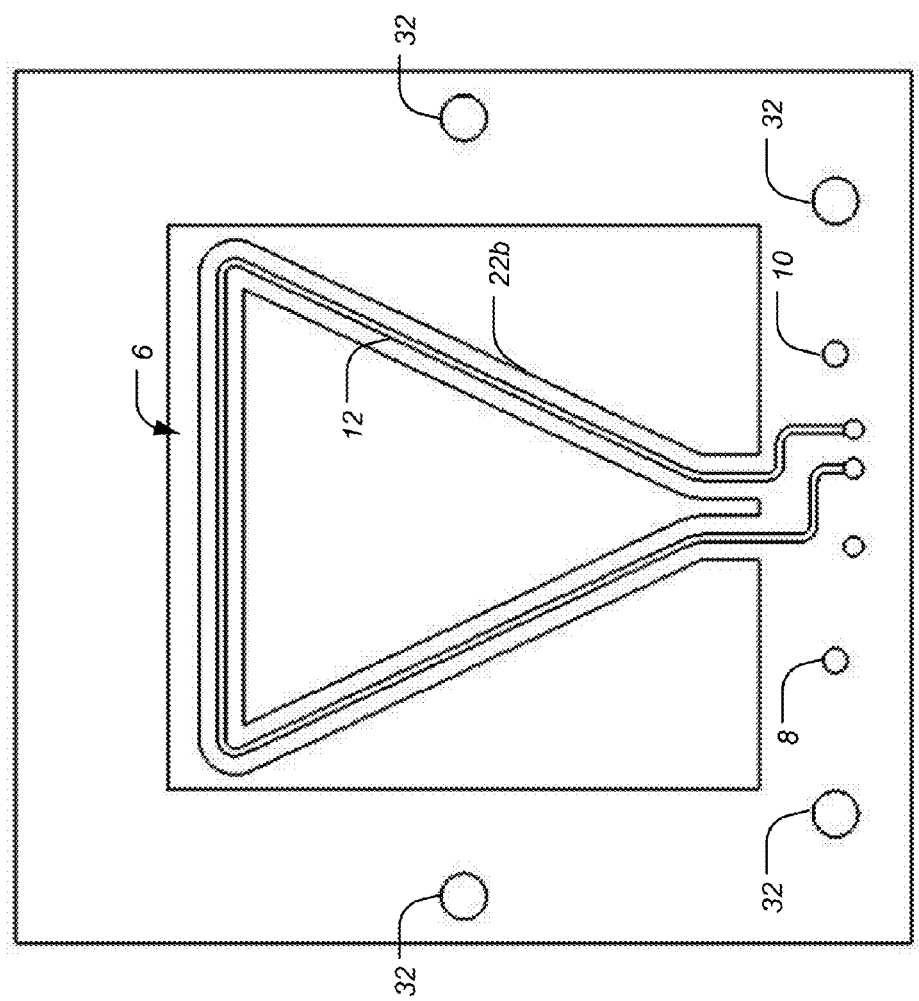
FIG. 2 illustrates a second substrate layer of the coriolis flow sensor of FIG. 1.

FIG. 2 illustrates a second substrate layer 20 of the coriolis flow sensor 2. The second substrate layer 20 comprises a second wall 22b. The second wall 22b may comprise one or more circuit components formed thereon. In the illustrated embodiment, the second wall 22b comprises an actuator 12 formed thereon. The actuator 12 is configured to generate mechanical movement, in the form of vibrations, in the flow channel 6. The actuator 12 is coupled to one or more circuit connections 16. The actuator 12 may comprise any suitable actuator configured to induce mechanical vibration of the flow channel 6. For example, in the illustrated embodiment, the actuator 12 comprises a conductive layer disposed on the second substrate layer 20. The conductive layer is configured to receive an alternating current from the circuit connections 16. When a magnetic field is present and the alternating current is provided to the actuator 12, the actuator 12 induces mechanical vibrations in the flow channel 6. In other embodiments, the actuator 12 may comprise any suitable actuator, such as, for example, a piezoelectric transducer, a mechanical actuator, an electrical actuator, or any other suitable actuator.

The sensors 24a, 24b are configured to detect vibrations generated in the first and second walls 22a, 22b of the flow channel 6 by the actuator 12. When there is no fluid flowing through the flow channel 6, the flow channel 6 vibrates symmetrically. When fluid flows through the flow channel 6, the flow channel 6 bends in response to a coriolis force generated by the fluid. A portion of the fluid in the flow channel 6 flows towards the axis of rotation (as generated by vibration of the flow channel 6) and a portion of the fluid flows away from the axis of rotation. The fluid flowing away from the axis of rotation causes the flow channel 6 to exert a force on the fluid to increase the angular momentum of the fluid, such that a first portion of the flow channel 6 lags behind the previously symmetrical vibration. The fluid flowing towards the axis of rotation will cause the flow channel 6 to exert a force on the fluid to decrease the fluid's angular momentum, causing a second portion of the flow channel 6 to lead the previously symmetrical vibration.

Due to the forces exerted by the flow channel 6, the first portion and the second portion of the flow channel 6 will asymmetrically vibrate. The asymmetrical vibration is a result of the coriolis force exerted by the fluid on the first wall 22a and the second wall 22b. The first portion of the flow channel 6, comprising an inlet portion, will lag behind the second portion of the flow channel, comprising an outlet portion. The vibrations of the flow channel 6 comprise a phase-shift that corresponds to the mass flow and/or density of the fluid flowing through the flow channel 6.

The sensors 24a, 24b may comprise any suitable sensor for detecting the vibrations and/or change in vibrations of the flow channel 6. The sensors 24a, 24b may comprise, for example, capacitive sensors, optic sensors, mechanical sensors, lidar sensors, acoustic sensors, ultrasonic sensors, and/or any other suitable sensor. The sensors 24a, 24b may be physically and/or non-physically coupled to the flow channel 6. For example, in one embodiment, a capacitive sensor is physically coupled to the flow channel 6 to detect vibrations of the flow channel 6. As another example, in one embodiment, an optical sensor is arranged to optically detect vibrations of the flow channel 6 without physical contact.

In some embodiments, the coriolis flow sensor 2 comprises a plurality of actuators 12 configured to induce vibration of the flow channel 6. A first actuator and a second actuator may be coupled to the flow channel 6 symmetrically away from a centerline of the flow channel 6. Each of the plurality of actuators is configured to generate symmetrical vibrations in the flow channel 6. A sensor may be mounted along the centerline of the flow channel 6 to detect vibrations corresponding to a coriolis force exerted on the first and second walls 22a, 22b of the flow channel 6.

Figure 3:
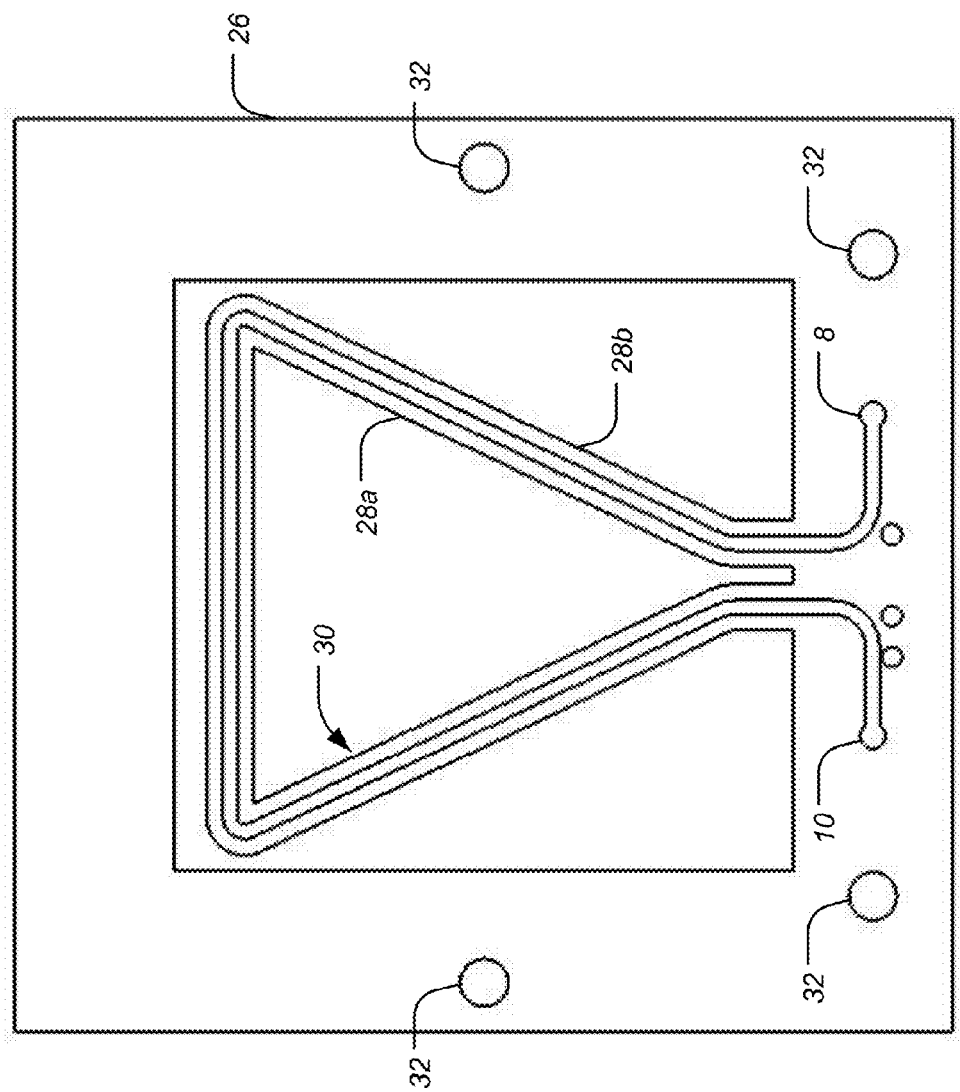
FIG. 3 illustrates a third substrate layer of the coriolis flow sensor of FIG. 1.

FIG. 3 illustrates one embodiment of a third substrate layer 26. The third substrate layer 26 is disposed between the first substrate layer 18 and the second substrate layer 20 in a stacked configuration. The third substrate layer 26 defines a flow path 30. The flow path 30 is defined by a first flow channel side 28a and a second flow channel side 28b. The inlet 8 and the outlet 10 are coupled to the flow path 30. When the first substrate layer 18, the second substrate layer 20, and the third substrate layer 26 are arranged in a stacked configuration, the first wall 22a, the flow path 30, and the second wall 22b define a flow channel 6 configured to receive a fluid therein. In some embodiments, the flow channel 6 comprises a geometric loop configured to provide angular and linear freedom of motion in a plane of the flow channel 6, wherein the angular and linear motion is caused by internal and external forces, such as, for example, an actuator 12 and/or the coriolis force generated by a fluid flowing through the flow channel 6.

Figure 4:
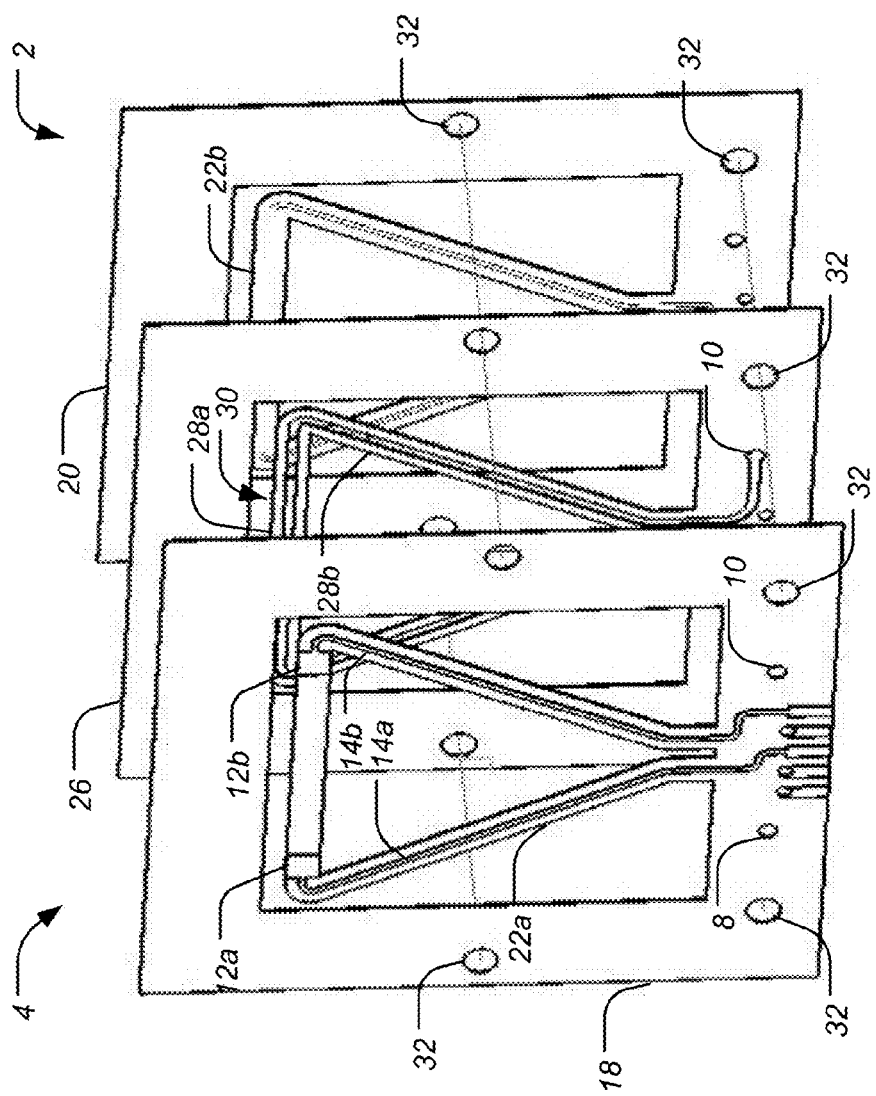
FIG. 4 illustrates an exploded view of the coriolis flow sensor of FIG. 1.

FIG. 4 illustrates an exploded view of the coriolis flow sensor 2. The first substrate layer 18, the second substrate layer 20, and the third substrate layer 26 are arranged in a stacked configuration. The third substrate layer 26 is located between first substrate layer 18 and the second substrate layer 20. The stacked substrate layers 18, 20, 26 are arranged such that the first wall 22a, the flow path 30, and the second wall 22b define a flow channel 6 configured to receive a fluid therein. The substrate layers 18, 20, 26 are coupled together to form a flow channel framework 4. When the first, second, and third substrate layers 18, 20, 26 are coupled together, the inlet 8 and the outlet 10 are arranged to allow fluid to flow into and out of the flow channel 6. One or more mounting holes 32 may be formed in each of the first, second, and third substrate layers 18, 20, 26. The mounting holes 32 are configured to allow the coriolis flow sensor 2 to be mounted to, for example, a control board.

In some embodiments, the first substrate layer 18, the second substrate layer 20, and the third substrate layer 26 comprise a specific dimensional relationship. For example, the first substrate layer 18, the second substrate layer 20, and the third substrate layer 26 each comprise a width, a length, and a thickness. The width, length, and thickness of each of the first, second, and third substrate layers 18, 20, 26 may comprise a specific relationship. For example, in one embodiment, the length of the first, second, and third substrate layers 18, 20, 26 is at least ten (10) times the width, and the width is at least three (3) times the thickness. Those skilled in the art will recognize that the first, second, and third substrate layers 18, 20, 26 may comprise any suitable dimensional relationship.

Each of the first, second, and/or third substrate layers 18, 20, 26 may comprise one or more suitable substrate materials. For example, in one embodiment, the first, second, and third substrate layers 18, 20, 26 comprise a printed circuit board (PCB) substrate material. The PCB substrate material may comprise any suitable PCB substrate material, such as, for example, laminate PCB materials, copper-clad laminate PCB materials, resin impregnated B-stage cloth PCB materials, and/or copper foil. Suitable PCB materials comprise, for example, FR-4, CEM-1, G-10, Kapton, and/or other laminate PCB materials. Each of the first, second, and/or third substrate layers 18, 20, 26 may comprise one or more circuit elements generated by, for example, additive and/or subtractive processes.

In one embodiment, the first, second, and third substrate layers 18, 20, 26 may be coupled together. The first, second, and third substrate layers may be coupled by, for example, lamination, pressure, chemicals, manufacturing processes, or any other suitable coupling process. For example, pressure and heat may be applied to the stacked substrate layers 18, 20, 26 to fuse the first substrate layer 18, the second substrate layer 20, and the third substrate layer 26 into an inseparable one piece flow channel framework 4. In some embodiments, the substrate layers 18, 20, 26, and/or one or more features of the substrate layers 18, 20, 26, may be formed through one or more manufacturing processes. For example, in one embodiment, the first, second, and third substrate layers 18, 20, 26 may be formed by laser cutting. As another example, the substrate layers 18, 20, 26 may be formed by laser cutting and/or etching to remove excess substrate material to form, for example, the first wall 22a, the second wall 22b, and/or the first and second flow channel sides 28a, 28b. Other suitable manufacturing processes may be used to form the first, second, and third substrate layers 18, 20, 26. For example, chemical etching, mechanical cutting/drilling, and/or other manufacturing processes may be used to form one or more of the substrate layers 18, 20, 26.

In some embodiments, a coating material is deposited on the inner surface of the flow channel 6. The coating material is configured to prevent interaction between the substrate material of the flow channel 6 and the fluid flowing through the flow channel 6. For example, in embodiments configured to measure an acidic or caustic fluid flow, the coating material may be configured to prevent breakdown of the substrate material due to interactions with the caustic fluid. The coating material is deposited on an inner surface of each of the first wall 22a, the second wall 22b, the first flow channel side 28a, and the second flow channel side 28b. The coating material may comprise any suitable coating and/or coating material, such as, for example, gold, stainless steel, glass, silicon, ceramic, elastomer materials, and/or any other suitable coating material.

Figure 5:
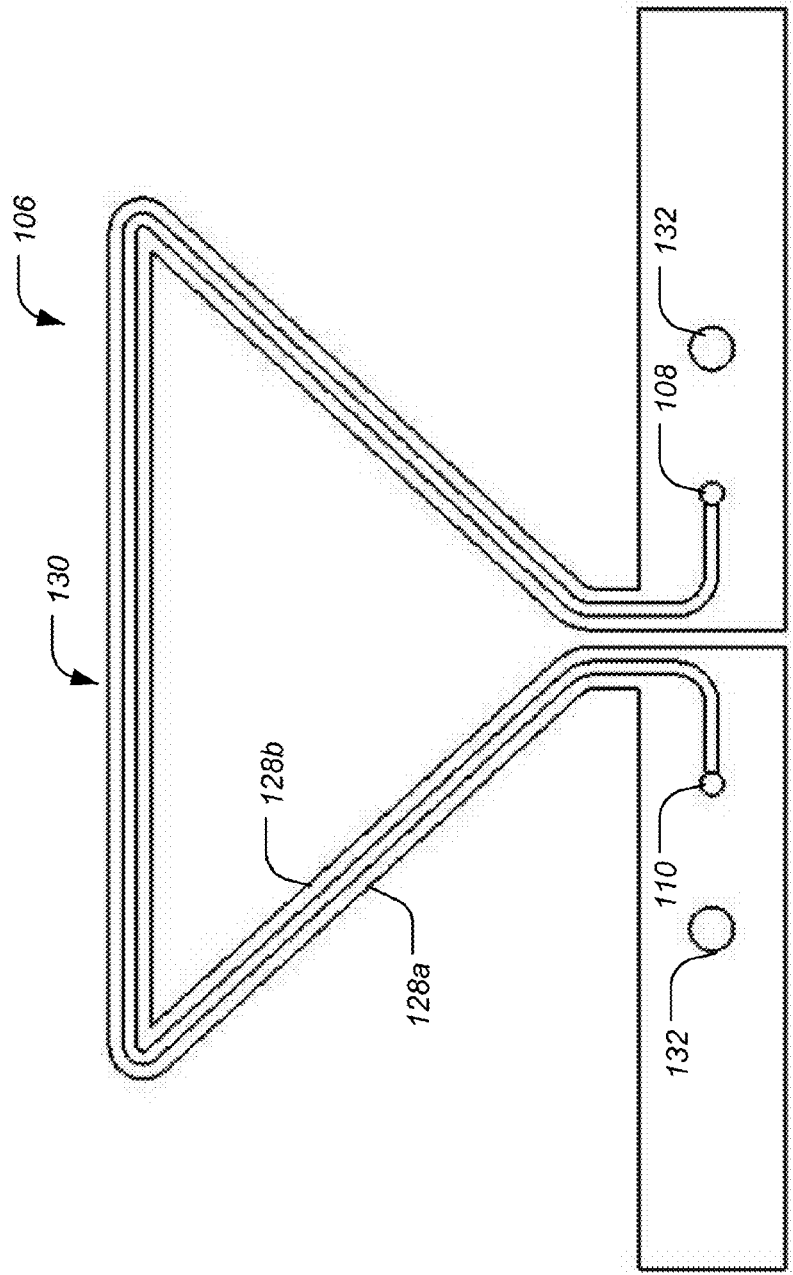
FIG. 5 illustrates one embodiment of a flow channel defined by a plurality of substrate layers.

FIG. 5 illustrates one embodiment of a flow channel 106. The flow channel 106 is configured to receive a fluid. One or more actuators may be physically, electrically, or otherwise coupled to the flow channel 106 to induce vibrations in the flow channel 106. In some embodiments, the flow channel 106 may comprise a conductive substrate. A gap is produced to allow actuation current to pass through the flow channel 106 to cause vibrations in the flow channel 106. The combination of the vibrations and a fluid flow through the flow channel 106 generates a coriolis force on the flow channel 106. The coriolis force may be detected by a sensor. The sensor may comprise, for example, a capacitance sensor, an optical sensor, or any other suitable sensor for detection the vibrations and/or change in vibrations of the flow channel 106. In some embodiments, a conductive substrate may comprise a ground for a capacitive sensor and/or a reflector for optical sensors. The coriolis force indicates the mass flow and/or the density of a fluid within the flow channel 106.

In some embodiments, the flow channel 106 comprises first and second substrate layers (not shown). The first substrate layer comprises a first wall and second substrate layer comprises a second wall. A third substrate layer 126 comprises a first flow channel side 128a and a second flow channel side 128b defining a flow path 130 therebetween. The first substrate layer, the second substrate layer, and the third substrate layer 126 are arranged in a stacked configuration. The third substrate layer 126 is disposed between the first and second substrate layers. The first wall, the flow path 130, and the second wall define a flow channel 106 when arranged in the stacked configuration. The flow channel 106 is configured to receive a fluid therein. An inlet 108 is configured to receive a fluid from, for example, a fluid tap attached to a fluid source. The fluid flows into the inlet 108, through the flow channel 106, and exits through an outlet 110. An actuator is coupled to the flow channel 106. The actuator is configured to vibrate the flow channel 106 at a predetermined rate. When a fluid is passed through the vibrating flow channel 106, a coriolis force is exerted on the flow channel 106, causing a bending and/or alteration in the vibration of the flow channel 106. The alteration in the vibrations may be detected by a sensor. The coriolis force exerted on the flow channel, as measured by the sensor, may indicate the mass flow and/or the density of the fluid flowing through the flow channel 106. One or more mounting holes 132 are configured to allow the flow channel 106 to be mounted to a fluid source and/or a control board. The first substrate layer, second substrate layer, and third substrate layer 126 may comprise, for example, one or more stainless steel sheets, printed circuit board (PCB) substrate, Kapton, FR4, or any other suitable substrate material.

Figure 6:
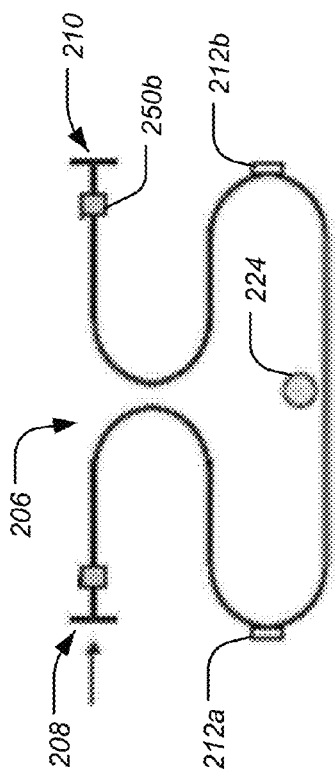
FIG. 6 illustrates one embodiment of a rectangular flow channel.
Figure 7:
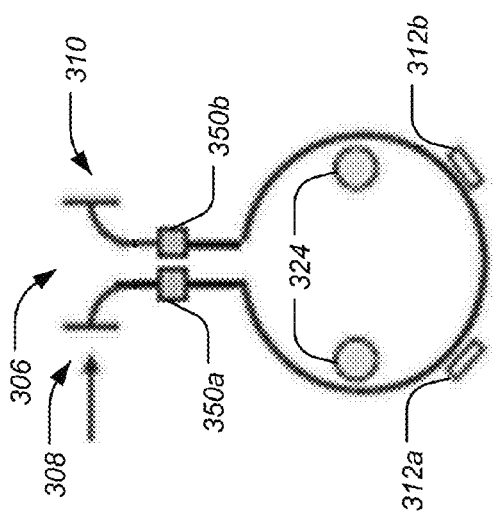
FIG. 7 illustrates one embodiment of circular flow channel.
Figure 8:
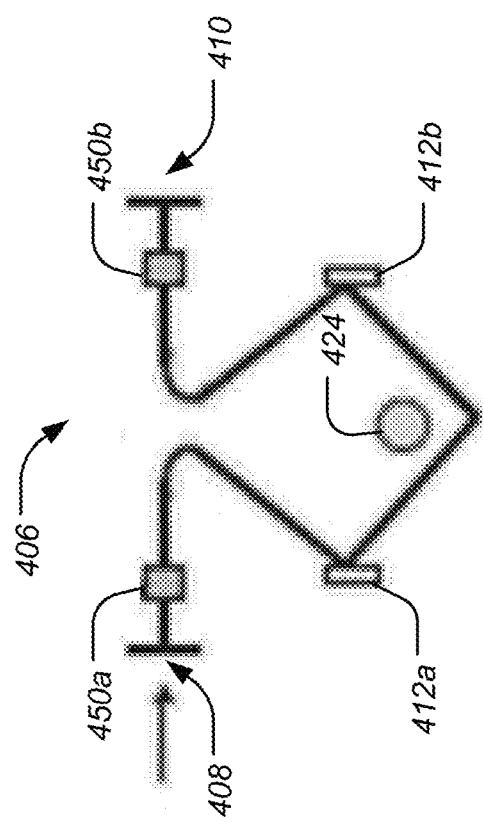
FIG. 8 illustrates one embodiment of diamond-shaped flow channel.

FIGS. 6-8 illustrate various flow channel shapes. FIG. 6 illustrates a rectangular flow channel 206. The rectangular flow channel 206 comprises a first substrate layer, a second substrate layer, and a third substrate layer. The rectangular flow channel 206 comprises an inlet 208 and an outlet 210. The rectangular flow channel 206 is configured to receive a fluid therein. One or more actuators 212a, 212b are coupled to the flow channel 206 to induce vibrations in the rectangular flow channel 206. One or more sensors 224 are configured to detect a change in vibration of the rectangular flow channel 206 caused by a fluid flow within the rectangular flow channel 206. In some embodiments, the rectangular flow channel 206 comprises multiple flow paths (not shown). One or more flow splitters 250a, 250b are configured to split the fluid flow at the inlet 208 into each of the multiple flow paths of the rectangular flow channel 206 and to join the multiple flow paths into a single outlet 210. The flow channel 206 comprises a substantially rectangular shape.

FIG. 7 illustrates a circular flow channel 306. The circular flow channel 306 comprises a first substrate layer, a second substrate layer, and a third substrate layer. The circular flow channel 306 comprises an inlet 308 and an outlet 310. The circular flow channel 306 is configured to receive a fluid therein. One or more actuators 312a, 312b are coupled to the flow channel 306 to induce vibrations in the circular flow channel 306. One or more sensors 324 are configured to detect a change in vibration of the circular flow channel 306 caused by a fluid flow within the circular flow channel 306. In some embodiments, the circular flow channel 306 comprises multiple flow paths (not shown). One or more flow splitters 350a, 350b are configured to split the fluid flow at the inlet 308 into each of the multiple flow paths of the rectangular flow channel 306 and to join the multiple flow paths into a single outlet 310. The flow channel 306 comprises a substantially circular shape.

FIG. 8 illustrates a diamond-shaped flow channel 406. The diamond-shaped flow channel 406 comprises a first substrate layer, a second substrate layer, and a third substrate layer. The diamond-shaped flow channel 406 comprises an inlet 408 and an outlet 410. The diamond-shaped flow channel 406 is configured to receive a fluid therein. One or more actuators 412a, 412b are coupled to the diamond-shaped flow channel 406 to induce vibrations in the diamond-shaped flow channel 406. One or more sensors 424 are configured to detect a change in vibration of the diamond-shaped flow channel 406 caused by a fluid flow within the diamond-shaped flow channel 406. In some embodiments, the diamond-shaped flow channel 406 comprises multiple flow paths (not shown). One or more flow splitters 450a, 450b are configured to split the fluid flow at the inlet 408 into each of the multiple flow paths of the diamond-shaped flow channel 406 and to joint the multiple flow paths into a single outlet 410. The diamond-shaped flow channel 406 comprises a substantially diamond shape.

In some embodiments, the actuators 412a, 412b comprise a conductive layer disposed on the flow channel 406. A magnetic field may be applied to the diamond-shaped flow channel 406. An alternating current may be delivered to and/or induced in the conductive layers of the actuators 412a, 412b. The magnetic field and the alternating current induce vibrations in the flow channel 406. In other embodiments, the actuators 412a, 412b comprise piezoelectric transducers coupled to the flow channel 406. The piezoelectric transducers are configured to receive a signal. The piezoelectric elements receive a signal, such as, for example, an ultrasonic signal, and generate vibrations in the flow channel 406 in response to the received signal. In other embodiments, any suitable mechanical, electrical, and/or electromechanical actuators may be coupled to the flow channel 406.

In some embodiments, a sensor 424 is coupled to the flow channel 406. The sensor 424 is configured to detect the vibrations of the flow channel 406. The one or more actuators 412a, 412b induce vibrations in the flow channel 406. When a fluid flows through the flow channel 406, the flow of the fluid and the vibration of the flow channel 406 generate a coriolis force that bends and/or alters the vibrations of the flow channel 406. The coriolis force is detected by the sensor 424. The coriolis force may be indicative of a mass flow and/or density of a fluid throwing through flow channel 406. Various shapes of flow channels 6, 106, 206, 306, 406 may be utilized depending on space considerations, fluid to be measured, and/or any other factor. In some embodiments, the actuators 412a, 412b are disposed symmetrically about a center line of the coriolis flow sensor 402 and the sensor 424 is disposed along the center line of the coriolis flow sensor 402. The geometric flow channels illustrated in FIGS. 4-9 are provided as examples only, and are not intended to be limiting. Those skilled in the art will recognize that other flow channel shapes, including regular and non-regular geometric shapes, may be implemented and are within the scope of the present disclosure.

Figure 9:
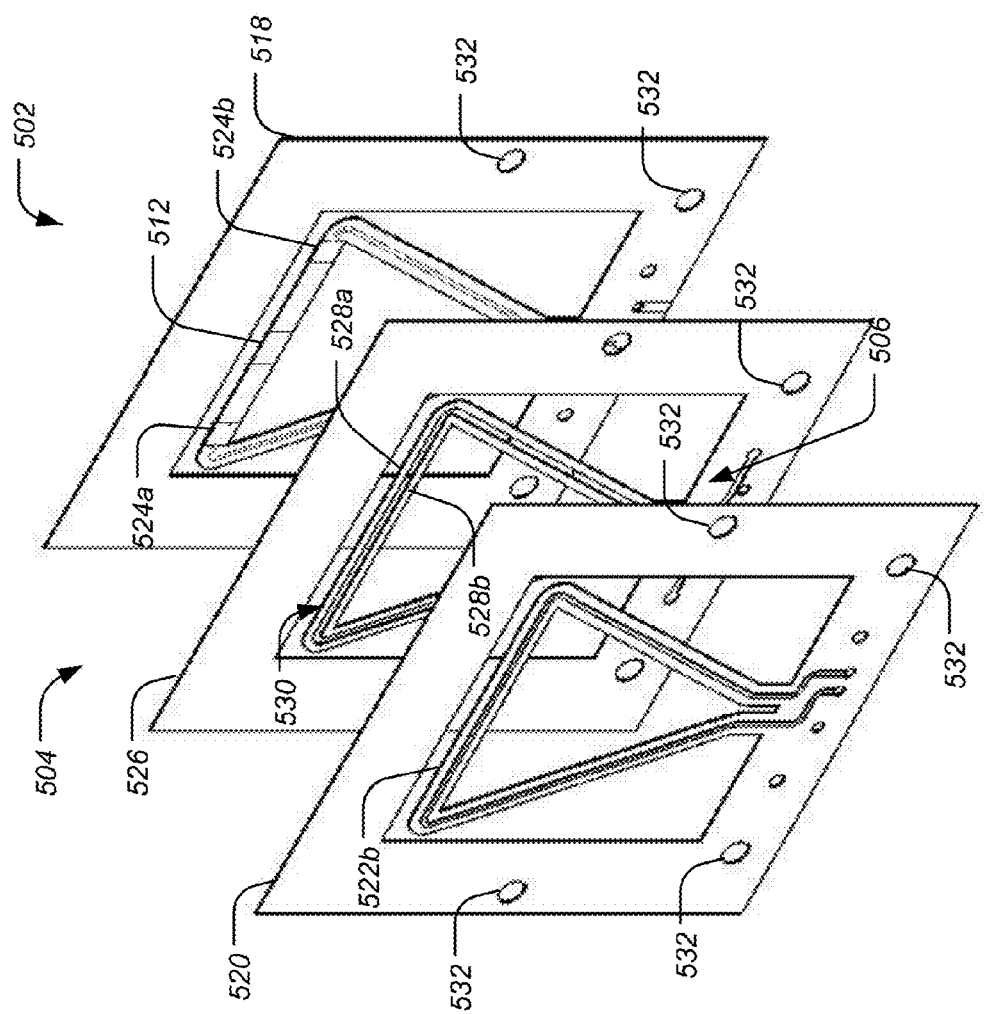
FIG. 9 illustrates one embodiment of a coriolis flow sensor comprising a plurality of symmetrically spaced sensors.

FIG. 9 illustrates a coriolis flow sensor 502 comprising a plurality of sensors 524a, 524b coupled to the flow channel 506. A first sensor 524a and a second sensor 524b are coupled to the flow channel 506 symmetrically away from a centerline of the flow channel 506. An actuator 512 is coupled to the flow channel 506 to induce vibrations therein. The actuator 512 is coupled to the flow channel 506 along the centerline and located symmetrically with respect to the first sensor 524a and the second sensor 524b. The actuator 512 may comprise, for example, a piezoelectric transducer, a conductive material, a mechanical element, or any other suitable actuator. The first and second sensors 524a, 524b are configured to detect a change in the vibrations of the flow channel 506 corresponding to a coriolis force generated by fluid flow through the flow channel 506. The coriolis force may correspond to the mass flow and/or density of the fluid flowing through the flow channel 506.

Figure 10:
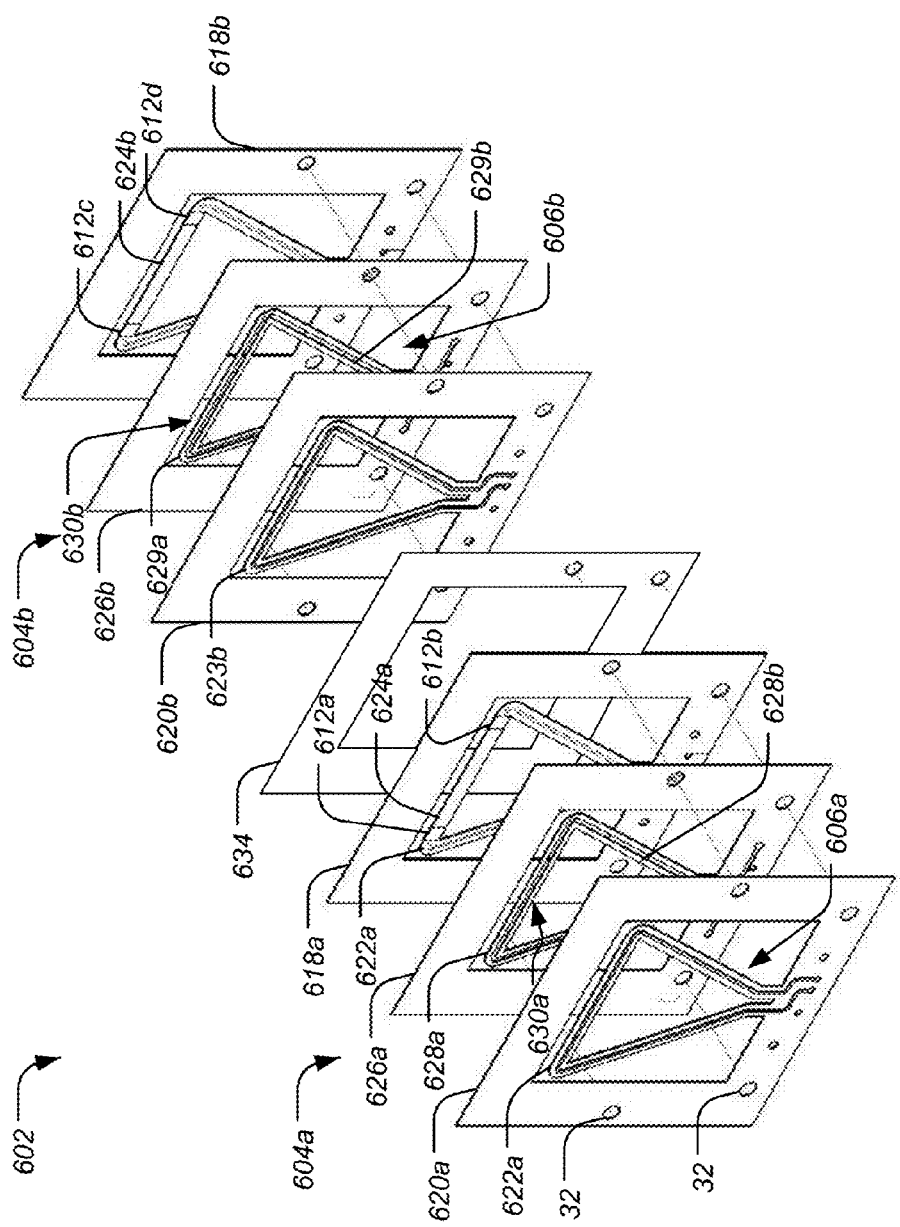
FIG. 10 illustrates one embodiment of a two-channel coriolis flow sensor comprising a plurality of substrate layers.

FIG. 10 illustrates one embodiment of a two-channel coriolis sensor 602. The two channel coriolis sensor comprises a first flow channel framework 604a and a second flow channel framework 604b. The first flow channel framework 604a defines a first flow channel 606a. The first flow channel framework 604a comprises a first substrate layer 618a, a second substrate layer 620a, and a third substrate layer 626a. The first substrate layer 618a comprises a first wall 622a. The second substrate layer 620a comprises a second wall 622b. The third substrate layer 626a comprises a first flow channel wall 628a and a second flow channel wall 628b defining a flow path 630a therebetween. The first substrate layer 618a, the second substrate layer 620a, and the third substrate layer 626a are arranged in a stacked configuration. The third substrate layer 626a is disposed between the first substrate layer 618a and the second substrate layer 620a. The first wall 622a of the first substrate layer 618a, the flow path 630a defined by the third substrate layer 626a, and the second wall 622b of the second substrate layer 620a define the first flow channel 606a. The first flow channel 606a is configured to receive a fluid therein. The first flow channel 606a comprises a geometric loop configured to provide angular and linear freedom of motion in a plane of the first flow channel 606a. The angular and linear motion is caused by internal and external forces, such as, for example, an actuator 612a, 612b and/or the coriolis force generated by a fluid flowing through the first flow channel 606a.

The second flow channel framework 604b defines a second flow channel 606b. The second flow channel framework 604b comprises a fourth substrate layer 618b, a fifth substrate layer 620b, and a sixth substrate layer 626b. The fourth substrate layer 618b comprises a first wall 623a. The fifth substrate layer 620b comprises a second wall 623b. The sixth substrate layer 626b comprises a first flow channel side 629a and a second flow channel side 629b defining a flow path 630b therebetween. The fourth substrate layer 618b, the fifth substrate layer 620b, and the sixth substrate layer 626b are arranged in a stacked configuration. The sixth substrate layer 626b is disposed between the fourth substrate layer 618b and the fifth substrate layer 620b. The first wall 623a of the fourth substrate layer 618b, the flow path 630b defined by the sixth substrate layer 626b, and the second wall 623b of the fifth substrate layer 620b define the second flow channel 606b. The second flow channel 606b is configured to receive a fluid therein. The second flow channel 606b comprises a geometric loop configured to provide angular and linear freedom of motion in a plane of the second flow channel 606b. The angular and linear motion is caused by internal and external forces, such as, for example, an actuator 612c, 612d and/or the coriolis force generated by a fluid flowing through the second flow channel 606b.

A substrate spacer layer 634 is disposed between the first flow channel framework 604a and the second flow channel framework 604b. The substrate spacer layer 634 is configured to space the first flow channel 606a and the second flow channel 606b at a sufficient distance such that the first flow channel 606a may vibrate without interfering with the second flow channel 606b, and the second flow channel 606b may vibrate without interfering with the first flow channel 606a. The first flow channel framework 604a, the substrate spacer layer 634, and the second flow channel framework 604b are arranged in a stacked configuration. The substrate spacer layer 634 may be disposed between the first flow channel framework 604a and the second flow channel framework 604b. The first substrate layer 618a, the second substrate layer 620a, the third substrate layer 626a, the fourth substrate layer 618a, the fifth substrate layer 620a, the sixth substrate layer 626b, and the substrate spacer layer 634 are coupled by, for example, lamination.

In some embodiments, one or more actuators 612a, 612b, 612c, 612d are coupled to the first flow channel 606a and/or the second flow channel 606b. The one or more actuators 612a-612d are configured to produce vibrations in the first flow channel 606a and/or the second flow channel 606b. The first flow channel 606a and/or the second flow channel 606b are configured to receive a fluid therein. The fluid flow through the first and/or second flow channels 606a, 606b and the vibrations of the flow channels 606a, 606b caused by the actuators 612a-612d generates a coriolis force. The coriolis force alters the vibrations of the first and second flow channels 606a, 606b and/or may bend the first and second flow channel 606a, 606b. A first sensor 624a is disposed on the first flow channel 606a and a second sensor 624b is disposed on the second flow channel 606b. The first sensor 624a and the second sensor 624b are configured to detect the coriolis force by, for example, detecting the vibrations and/or change in vibrations of the first and second flow channels 606a, 606b. The coriolis force exerted by the fluid on the flow channels 606a, 606b may correspond to the mass flow and/or the density of the fluid flowing through the first flow channel 606a and/or the second flow channel 606b.

In some embodiments, the actuators 612a, 612b coupled to the first flow channel 606a and the actuators 612c, 612d coupled to the second flow channel 606b are configured to generate counter-vibrations in the first flow channel 606a and the second flow channel 606b. Counter vibration of the first flow channel 606a and the second flow channel 606b may reduce or eliminate interference due to outside vibrations of the coriolis flow sensor 602 and/or a structure coupled to the coriolis flow sensor 602. When there is no fluid flowing through the first flow channel 606a or the second flow channel 606b, the first flow channel 606a and the second flow channel 606b may vibrate symmetrically. When fluid flows through the first flow channel 606a and the second flow channel 606b, twisting of the first and second flow channels 606a, 606b may occur in response to the coriolis force generated by the fluid. A portion of the fluid in each flow channel 606a, 606b may flow towards the axis of rotation (as generated by vibration of the first and second flow channels 606a, 606b) and a portion of the fluid may flow away from the axis of rotation. The fluid flowing away from the axis of rotation causes a first portion of the first and/or second flow channels 606a, 606b to exert a force on the fluid to increase the angular momentum of the fluid, and therefore the first portion of each of the first and second flow channel 606a, 606b lags behind the overall vibration. The fluid flowing towards the axis of rotation causes a second portion of the first and second flow channels 606a, 606b to exert a force on the fluid to decrease the fluid's angular momentum, and therefore the second portion of each of the first and second flow channels 606a, 606b leads the vibration.

When no fluid is present, the first and second flow channels 606a, 606b vibrate symmetrically at the same frequency. When there is a flow of fluid through the first and/or the second flow channels 606a, 606b, the first portion of the first and/or second flow channel 606a, 606b comprising fluid flowing towards the axis of rotation and the second portion of the first and/or second flow channel 606a, 606b comprising fluid flowing away from the axis of rotation will asymmetrically vibrate, with the inlet portion lagging behind the outlet portion of each of the first and second flow channels 606a, 606b. The vibrations of the two (or more) portions of each of the first and second flow channels 606a, 606b comprise a phase-shift that corresponds to the mass flow and/or density of the fluid flowing through the first and second flow channels 606a, 606b. Although a two-channel coriolis flow sensor 602 has been discussed, those skilled in the art will recognize that any number of flow channels, flow channel frameworks, and/or substrate spacers may arranged and laminated into a single structure.

Figure 11:
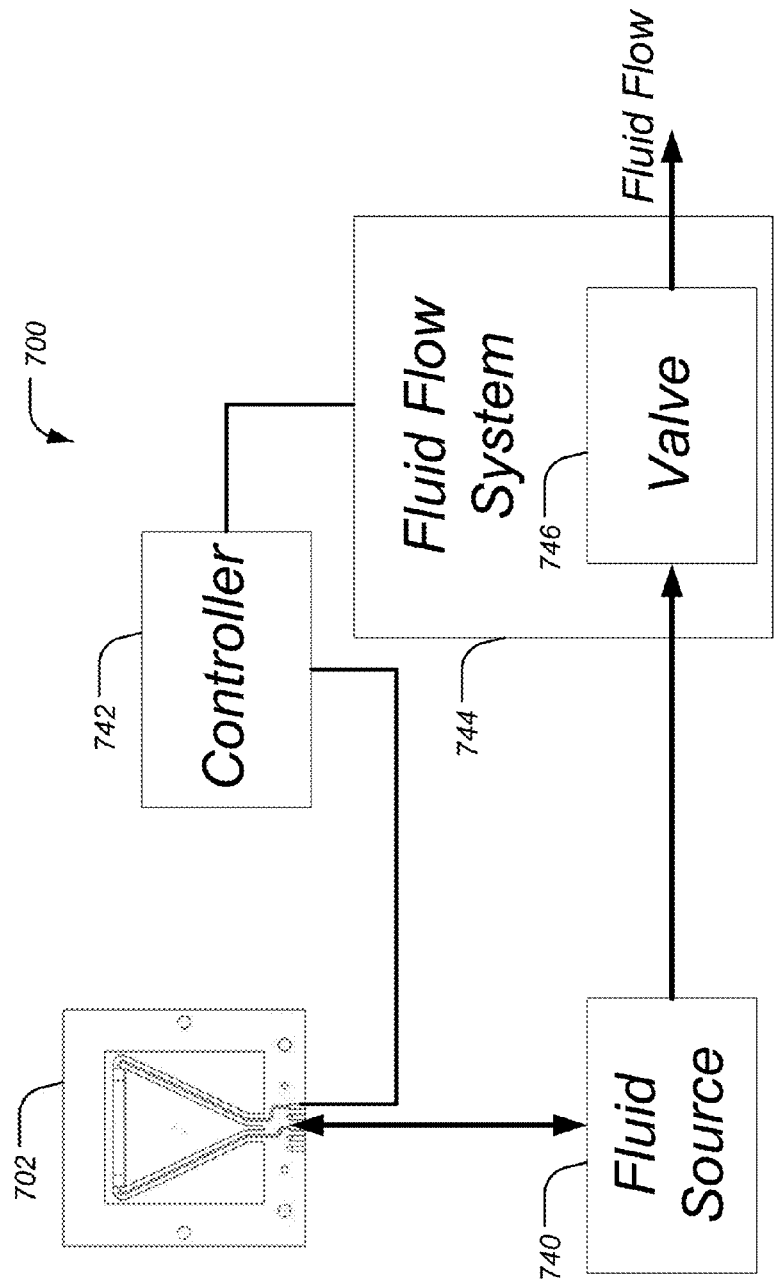
FIG. 11 illustrates a block diagram of one embodiment of a control system including a coriolis flow sensor comprising a plurality of substrate layers.

FIG. 11 illustrates a block diagram of one embodiment of a control system 700. The control system 700 comprises a coriolis flow sensor 702. The coriolis flow sensor 702 is coupled to a fluid source 740. In some embodiments, the fluid source 740 comprises a storage vessel for storing one or more fluids therein. In other embodiments, the fluid source 740 comprises a flow channel, such as, for example, a pipe, tube, or other flow channel, comprising a fluid flowing therein. The coriolis flow sensor 702 comprises at least one flow channel coupled to the fluid source 740. A portion, or all, of the fluid within the fluid source 740 flows into the flow channel of the coriolis flow sensor 702. The coriolis flow sensor 702 is configured to measure the mass flow and/or the density of the fluid flowing through the flow channel of the coriolis flow sensor 702. The coriolis flow sensor 702 generates a signal indicative of the mass flow and/or the density of the fluid flowing within the flow channel. The coriolis flow sensor 702 is electrically coupled to a controller 742. The coriolis flow sensor 702 is configured to provide the signal indicative of the mass flow and/or density to the controller 742.

The controller 742 is configured to receive the signal indicative of the mass flow and/or density of the fluid from the coriolis flow sensor 702. The controller 742 is configured to control one or more systems, such as, for example, a fluid flow system 744. The controller 742 controls one or more components of the fluid flow system 744, such as, for example, a valve 746. The controller 742 controls the valve 746 in response to the signal from the coriolis flow sensor 702. For example, in one embodiment, when the coriolis flow sensor 702 indicates a mass flow rate from the fluid source below a specific threshold, the controller 742 operates the valve 746 to increase the mass flow rate from the fluid source 740. When the coriolis flow sensor 702 indicates a mass flow rate above a specific threshold, the controller 742 operates the valve 746 to decrease the mass flow rate from the fluid source 740. The coriolis flow sensor 702, the controller 742, and/or one or more components may comprise a plurality of substrate layers coupled by, for example, lamination.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

Various aspects of the subject matter described herein are set out in the following numbered clauses:

1. An apparatus, comprising: a first substrate layer comprising a first wall; a second substrate layer comprising a second wall; and a third substrate layer disposed between the first and second substrate layers in a stacked configuration, the third substrate layer defining a flow path, wherein the first and second walls of the respective first and second substrates and the flow path defined by the third substrate layer define a first flow channel configured to receive a fluid therethrough, wherein the first flow channel comprises a geometric loop configured to provide angular and linear freedom of motion in a plane of the first flow channel, wherein the angular and linear motion is caused by internal and external forces.

2. The apparatus of clause 1, comprising: a first actuator configured to generate vibrations in the first flow channel; and a first sensor coupled to the first flow channel to detect vibrations of the first and second walls of the first flow channel, wherein the vibrations correspond to a coriolis force exerted on the first and second walls of the first flow channel when the fluid flows within the first flow channel.

3. The apparatus of clause 2, comprising a second sensor coupled to the first flow channel, wherein the first sensor and the second sensor are coupled to the first flow channel in a symmetrical arrangement with respect to a centerline of the first flow channel.

4. The apparatus of clause 2, wherein the first actuator comprises a conductive layer disposed one at least one of the first, second, or third substrate layer, wherein the conductive layer is configured to generate vibrations in the first flow channel when a magnetic field is present and an alternating current is applied to the conductive layer.

5. The apparatus of clause 2, comprising a second actuator configured to generate vibrations in the first flow channel, wherein the first actuator and the second actuator are configured to generate symmetric vibrations in the first flow channel.

6. The apparatus of clause 2, comprising: a fourth substrate layer comprising a first wall; a fifth substrate layer comprising a second wall; a sixth substrate layer disposed between the fourth and fifth substrate layers in a stacked configuration, the sixth substrate layer defining a flow path, wherein the first and second walls of the respective fourth and fifth substrate layers and the flow path defined by the sixth substrate layer define a second flow channel configured to receive a fluid therethrough, wherein the second flow channel comprises a geometric loop configured to provide angular and linear freedom of motion in a plane of the second flow channel, wherein the angular and linear motion is caused by internal and external forces; a second actuator configured to generate vibrations in the second flow channel; and a second sensor coupled to the second flow channel to detect vibrations of the first and second walls of the second flow channel, wherein the vibrations correspond to a coriolis force exerted on the first and second walls of the second flow channel when the fluid flows within the second flow channel.

7. The apparatus of clause 7, comprising a substrate spacer layer, wherein the substrate spacer layer is disposed between the third substrate layer and the fourth substrate layer, and wherein the first substrate layer, the second substrate layer, the third substrate layer, the substrate spacer layer, the fourth substrate layer, the fifth substrate layer, and the sixth substrate layer are arranged in a stacked configuration.

8. The apparatus of clause 2, wherein the actuator comprises a conductive layer deposited on at least one of the first, second, or third substrate layers, and wherein the conductive layer is configure to generate vibrations in the first flow channel when an alternating current is applied to the conductive layer.

9. The apparatus of clause 2, wherein the actuator comprises a piezoelectric transducer coupled to the first flow channel.

10. The apparatus of clause 2, wherein the first sensor comprises a capacitance sensor.

11. The apparatus of clause 2, wherein the first sensor comprises an optical sensor.

12. The apparatus of clause 1, wherein the first, second, and third substrate layers are laminated.

13. The apparatus of clause 1, comprising a coating material deposited on an internal surface of the first flow channel, wherein the coating material is configured to prevent interaction between the fluid and the substrate of the first flow channel.

14. The apparatus of clause 13, wherein the coating material is selected from the group consisting of: gold, stainless steel, glass, silicon, ceramic, and elastomer.

15. The apparatus of clause 1, wherein the first substrate layer, the second substrate layer, and the third substrate layer each comprise a printed circuit board layer.

16. The apparatus of clause 15, wherein the first substrate layer, the second substrate layer, and the third substrate layer each comprises a Kapton substrate.

17. An integrated system for measuring flow of a medium, comprising: a control circuit; a coriolis flow sensor in signal communication with the control circuit, the coriolis flow sensor comprising: a first substrate layer comprising a first wall; a second substrate layer comprising a second wall; a third substrate layer disposed between the first and second substrate layers in a stacked configuration, the third substrate layer defining a flow path, wherein the first and second walls of the respective first and second substrate layers and the flow path defined by the third substrate layer define a first flow channel configured to receive a fluid therethrough, and wherein the first flow channel comprises a geometric loop configured to provide angular and linear freedom of motion in a plane of the first flow channel, wherein the angular and linear motion is caused by internal and external forces; an actuator configured to generate vibrations in the first flow channel; and a first sensor coupled to the first flow channel to detect vibrations of the first and second walls of the first flow channel, wherein the vibrations correspond to a coriolis force exerted on the first and second walls of the first flow channel when the fluid flows within the first flow channel.

18. The integrated system of clause 17, wherein the first, second, and third substrate layers are laminated.

19. The integrated system of clause 17, comprising a control valve configured to control a flow rate of the fluid, wherein the control valve is controlled by the control circuit in response to the coriolis flow sensor.

20. The integrated system of clause 17, wherein the coriolis sensor comprises: a fourth substrate layer comprising a first wall; a fifth substrate layer comprising a second wall; a sixth substrate layer disposed between the fourth and fifth substrate layers in a stacked configuration, the sixth substrate layer defining a flow path, wherein the first and second walls of the fourth and fifth substrate layers and the flow path defined by the sixth substrate layer define a second flow channel configured to receive a fluid therethrough, and wherein the second flow channel comprises a geometric loop configured to provide angular and linear freedom of motion in a plane of the second flow channel, wherein the angular and linear motion is caused by internal and external forces; a second actuator configured to generate vibrations in the second flow channel; a third sensor coupled to the second flow channel to detect vibrations of the first and second walls of the second flow channel, wherein the vibrations correspond to a coriolis force exerted on the first and second walls of the second flow channel when the fluid flows within the second flow channel; and a substrate spacer located between the first flow channel and the second flow channel, and wherein the first flow channel, the substrate spacer, and the second flow channel are laminated.

21. A method for generating a coriolis flow/density sensor, comprising: arranging a first substrate layer, a second substrate layer, and a third substrate layer in a stacked configuration, wherein the first substrate layer comprise a first wall and the second substrate layer comprises a second wall, wherein the third substrate layer defines a flow path, wherein the first and second walls of the first and second substrates and the flow path defined by the third substrate layer define a first flow channel configured to receive a fluid therethrough, and wherein the first flow channel comprises a geometric loop configured to provide angular and linear freedom of motion in a plane of the first flow channel, wherein the angular and linear motion is caused by internal and external forces; and laminating the first substrate layer, the second substrate layer, and the third substrate layer.

22. The method of clause 21, comprising: coupling a first actuator to the first flow channel to generate vibrations in the first flow channel; and coupling a first sensor to the first flow channel to detect vibrations in the first and second walls of the first flow channel, wherein the vibrations correspond to a coriolis force exerted on the first and second walls of the first flow channel when the fluid flows within the first flow channel.

23. The method of clause 21, comprising cutting, by a laser cutting process, the first wall in the first substrate layer, the second wall in the second substrate layer, and the flow path in the third substrate layer.

24. The method of clause 21, comprising: arranging a fourth substrate layer, a fifth substrate layer, and a sixth substrate layer in a stacked configuration, wherein the fourth substrate layer comprises a first wall and the fifth substrate layer comprise a second wall, wherein the sixth substrate layer defines a flow path, wherein the first and second walls of the respective fourth and fifth substrate layers and the flow path defined by the sixth substrate layer define a second flow channel configured to receive a fluid therethrough, and wherein the second flow channel comprises a geometric loop configured to provide angular and linear freedom of motion in a plane of the second flow channel, wherein the angular and linear motion is caused by internal and external forces; arranging a substrate spacer layer between the third substrate layer and the fourth substrate layer; and laminating the first, second, third, fourth, fifth and sixth substrate layers and the substrate spacer layer.

25. The method of clause 21, comprising depositing a coating material on the inner surface of the flow channel, wherein the coating material is configured to prevent interaction between the fluid and the substrate.

26. An apparatus comprising: a first substrate layer comprising a first wall; a second substrate layer comprising a second wall; a third substrate layer disposed between the first and second substrate layers in a stacked configuration, the third substrate layer defining a flow path, wherein the first and second walls of the respective first and second substrates and the flow path defined by the third substrate layer define a first flow channel configured to receive a fluid therethrough, wherein the first substrate layer, the second substrate layer, and the third substrate layer comprise a flexible plastic film substrate, and wherein the first flow channel comprises a geometric loop configured to provide angular and linear freedom of motion in a plane of the first flow channel, wherein the angular and linear motion is caused by internal and external forces; an actuator configured to generate vibrations in the first flow channel; and a first sensor and a second sensor mounted symmetrically away from a centerline of the first flow channel to detect vibrations of the first and second walls of the first flow channel, wherein the vibrations correspond to a coriolis force exerted on the first and second walls of the first flow channel when the fluid flows within the first flow channel.

What is claimed is:

1. An apparatus, comprising:
a first substrate layer comprising a first wall;
a second substrate layer comprising a second wall; and
a third substrate layer disposed between the first and second substrate layers in a stacked configuration, the third substrate layer defining a flow path, wherein the first and second walls of the respective first and second substrates and the flow path defined by the third substrate layer define a first flow channel configured to receive a fluid therethrough, wherein the first flow channel comprises a geometric loop configured to provide angular and linear freedom of motion in a plane of the first flow channel, wherein the angular and linear motion is caused by internal and external forces; and
a first actuator configured to generate vibrations in the first flow channel;
wherein the first actuator comprises a conductive layer disposed on at least one of the first, second, or third substrate layer, wherein the conductive layer is configured to generate vibrations in the first flow channel when a magnetic field is present and an alternating current is applied to the conductive layer.

2. The apparatus of claim 1, comprising:
a first sensor coupled to the first flow channel to detect vibrations of the first and second walls of the first flow channel, wherein the vibrations correspond to a Coriolis force exerted on the first and second walls of the first flow channel when the fluid flows within the first flow channel.

3. The apparatus of claim 2, comprising a second sensor coupled to the first flow channel, wherein the first sensor and the second sensor are coupled to the first flow channel in a symmetrical arrangement with respect to a centerline of the first flow channel.

4. The apparatus of claim 2, comprising a second actuator configured to generate vibrations in the first flow channel, wherein the first actuator and the second actuator are configured to generate symmetric vibrations in the first flow channel.

5. The apparatus of claim 2, comprising:
a fourth substrate layer comprising a first wall;
a fifth substrate layer comprising a second wall;
a sixth substrate layer disposed between the fourth and fifth substrate layers in a stacked configuration, the sixth substrate layer defining a flow path, wherein the first and second walls of the respective fourth and fifth substrate layers and the flow path defined by the sixth substrate layer define a second flow channel configured to receive a fluid therethrough, wherein the second flow channel comprises a geometric loop configured to provide angular and linear freedom of motion in a plane of the second flow channel, wherein the angular and linear motion is caused by internal and external forces;
a second actuator configured to generate vibrations in the second flow channel; and
a third sensor coupled to the second flow channel to detect vibrations of the first and second walls of the second flow channel, wherein the vibrations correspond to a Coriolis force exerted on the first and second walls of the second flow channel when the fluid flows within the second flow channel.

6. The apparatus of claim 5, comprising a substrate spacer layer, wherein the substrate spacer layer is disposed between the third substrate layer and the fourth substrate layer, and wherein the first substrate layer, the second substrate layer, the third substrate layer, the substrate spacer layer, the fourth substrate layer, the fifth substrate layer, and the sixth substrate layer are arranged in a stacked configuration.

7. The apparatus of claim 2, wherein the first actuator comprises a conductive layer deposited on at least one of the first, second, or third substrate layers, and wherein the conductive layer is configured to generate vibrations in the first flow channel when an alternating current is applied to the conductive layer.

8. The apparatus of claim 2, wherein the first actuator comprises a piezoelectric transducer coupled to the first flow channel.

9. The apparatus of claim 2, wherein the first sensor comprises a capacitance sensor.

10. The apparatus of claim 2, wherein the first sensor comprises an optical sensor.

11. The apparatus of claim 1, wherein the first, second, and third substrate layers are laminated.

12. The apparatus of claim 1, comprising a coating material deposited on an internal surface of the first flow channel, wherein the coating material is configured to prevent interaction between the fluid and the substrate of the first flow channel.

13. The apparatus of claim 12, wherein the coating material is selected from the group consisting of: gold, stainless steel, glass, silicon, ceramic, and elastomer.

14. The apparatus of claim 1, wherein the first substrate layer, the second substrate layer, and the third substrate layer each comprise a printed circuit board layer.

15. The apparatus of claim 14, wherein the first substrate layer, the second substrate layer, and the third substrate layer each comprises a Kapton substrate.

16. An integrated system for measuring flow of a medium, comprising:
a control circuit;
a Coriolis flow sensor in signal communication with the control circuit, the Coriolis flow sensor comprising:
a first substrate layer comprising a first wall;
a second substrate layer comprising a second wall;
a third substrate layer disposed between the first and second substrate layers in a stacked configuration, the third substrate layer defining a flow path, wherein the first and second walls of the respective first and second substrate layers and the flow path defined by the third substrate layer define a first flow channel configured to receive a fluid therethrough, and wherein the first flow channel comprises a geometric loop configured to provide angular and linear freedom of motion in a plane of the first flow channel, wherein the angular and linear motion is caused by internal and external forces;
a first actuator configured to generate vibrations in the first flow channel; and a first sensor coupled to the first flow channel to detect vibrations of the first and second walls of the first flow channel, wherein the vibrations correspond to a Coriolis force exerted on the first and second walls of the first flow channel when the fluid flows within the first flow channel;

wherein the first actuator comprises a conductive layer disposed on at least one of the first, second, or third substrate layer, wherein the conductive layer is configured to generate vibrations in the first flow channel when a magnetic field is present and an alternating current is applied to the conductive layer.

17. The integrated system of claim 16, wherein the first, second, and third substrate layers are laminated.

18. The integrated system of claim 16, comprising a control valve configured to control a flow rate of the fluid, wherein the control valve is controlled by the control circuit in response to the Coriolis flow sensor.

19. The integrated system of claim 16, wherein the Coriolis sensor comprises:
a fourth substrate layer comprising a first wall;
a fifth substrate layer comprising a second wall;
a sixth substrate layer disposed between the fourth and fifth substrate layers in a stacked configuration, the sixth substrate layer defining a flow path, wherein the first and second walls of the fourth and fifth substrate layers and the flow path defined by the sixth substrate layer define a second flow channel configured to receive a fluid therethrough, and wherein the second flow channel comprises a geometric loop configured to provide angular and linear freedom of motion in a plane of the second flow channel, wherein the angular and linear motion is caused by internal and external forces;
a second actuator configured to generate vibrations in the second flow channel;
a second sensor coupled to the second flow channel to detect vibrations of the first and second walls of the second flow channel, wherein the vibrations correspond to a Coriolis force exerted on the first and second walls of the second flow channel when the fluid flows within the second flow channel; and
a substrate spacer located between the first flow channel and the second flow channel, and wherein the first flow channel, the substrate spacer, and the second flow channel are laminated.

20. A method for generating a Coriolis flow/density sensor, comprising:
arranging a first substrate layer, a second substrate layer, and a third substrate layer in a stacked configuration, wherein the first substrate layer comprise a first wall and the second substrate layer comprises a second wall, wherein the third substrate layer defines a flow path, wherein the first and second walls of the first and second substrates and the flow path defined by the third substrate layer define a first flow channel configured to receive a fluid therethrough, and wherein the first flow channel comprises a geometric loop configured to provide angular and linear freedom of motion in a plane of the first flow channel, wherein the angular and linear motion is caused by internal and external forces; and
laminating the first substrate layer, the second substrate layer, and the third substrate layer;
coupling an actuator to the first flow channel to generate vibrations in the first flow channel; and
disposing a conductive layer over at least one of the first, second, or third substrate layer of the actuator, wherein the conductive layer is configured to generate vibrations in the first flow channel when a magnetic field is present and an alternating current is applied to the conductive layer.

21. The method of claim 20, comprising:
coupling a first sensor to the first flow channel to detect vibrations in the first and second walls of the first flow channel, wherein the vibrations correspond to a Coriolis force exerted on the first and second walls of the first flow channel when the fluid flows within the first flow channel.

22. The method of claim 20, comprising cutting, by a laser cutting process, the first wall in the first substrate layer, the second wall in the second substrate layer, and the flow path in the third substrate layer.

23. The method of claim 20, comprising:
arranging a fourth substrate layer, a fifth substrate layer, and a sixth substrate layer in a stacked configuration, wherein the fourth substrate layer comprises a first wall and the fifth substrate layer comprise a second wall, wherein the sixth substrate layer defines a flow path, wherein the first and second walls of the respective fourth and fifth substrate layers and the flow path defined by the sixth substrate layer define a second flow channel configured to receive a fluid therethrough, and wherein the second flow channel comprises a geometric loop configured to provide angular and linear freedom of motion in a plane of the second flow channel, wherein the angular and linear motion is caused by internal and external forces;
arranging a substrate spacer layer between the third substrate layer and the fourth substrate layer; and
laminating the first, second, third, fourth, fifth and sixth substrate layers and the substrate spacer layer.

24. The method of claim 20, comprising depositing a coating material on the inner surface of the flow channel, wherein the coating material is configured to prevent interaction between the fluid and the substrate.

25. An apparatus comprising:
a first substrate layer comprising a first wall;
a second substrate layer comprising a second wall;
a third substrate layer disposed between the first and second substrate layers in a stacked configuration, the third substrate layer defining a flow path, wherein the first and second walls of the respective first and second substrates and the flow path defined by the third substrate layer define a first flow channel configured to receive a fluid therethrough, wherein the first substrate layer, the second substrate layer, and the third substrate layer comprise a flexible plastic film substrate, and wherein the first flow channel comprises a geometric loop configured to provide angular and linear freedom of motion in a plane of the first flow channel, wherein the angular and linear motion is caused by internal and external forces;
an actuator configured to generate vibrations in the first flow channel; and
a first sensor and a second sensor mounted symmetrically away from a centerline of the first flow channel to detect vibrations of the first and second walls of the first flow channel, wherein the vibrations correspond to a Coriolis force exerted on the first and second walls of the first flow channel when the fluid flows within the first flow channel;
wherein the actuator comprises a conductive layer disposed on at least one of the first, second, or third substrate layer, wherein the conductive layer is configured to generate vibrations in the first flow channel when a magnetic field is present and an alternating current is applied to the conductive layer.

* * * * *